US009878473B2

(12) United States Patent
Katou

(10) Patent No.: US 9,878,473 B2
(45) Date of Patent: Jan. 30, 2018

(54) MULTILAYER CONTACT LENS AND PRODUCTION PROCESS THEREFOR

(71) Applicant: MENICON NECT CO., LTD., Aichi (JP)

(72) Inventor: Yasuhiko Katou, Aichi (JP)

(73) Assignee: MENICON NECT CO., LTD, Aichi (JP)

( * ) Notice: Subject to any disclaimer, the term of this patent is extended or adjusted under 35 U.S.C. 154(b) by 285 days.

(21) Appl. No.: 14/406,468

(22) PCT Filed: Jun. 17, 2013

(86) PCT No.: PCT/JP2013/066635
§ 371 (c)(1),
(2) Date: Dec. 8, 2014

(87) PCT Pub. No.: WO2013/191148
PCT Pub. Date: Dec. 27, 2013

(65) Prior Publication Data
US 2015/0137397 A1    May 21, 2015

(30) Foreign Application Priority Data

Jun. 19, 2012  (JP) .................................. 2012-137562

(51) Int. Cl.
*B29D 11/00* (2006.01)
*B29C 43/14* (2006.01)
*B29C 39/12* (2006.01)
*G02C 7/04* (2006.01)
(Continued)

(52) U.S. Cl.
CPC .......... *B29C 43/146* (2013.01); *B29C 39/025* (2013.01); *B29C 39/12* (2013.01);
(Continued)

(58) Field of Classification Search
CPC ........ B29D 11/00048; B29D 11/00923; B29D 11/0073; B29D 11/00192; B29C 43/146; B29C 43/36; B29C 39/12; B29C 39/025
See application file for complete search history.

(56) References Cited

U.S. PATENT DOCUMENTS 4,701,288 A    10/1987  Cook et al.
5,894,002 A     4/1999  Boneberger et al.
(Continued)

FOREIGN PATENT DOCUMENTS

JP      59-29411  B2    7/1984
JP      62-50126  A     3/1987
(Continued)

OTHER PUBLICATIONS

International Search Report dated Sep. 10, 2013 from corresponding International Patent Application No. PCT/JP2013/066635; 4 pgs.

*Primary Examiner* — Mathieu Vargot
(74) *Attorney, Agent, or Firm* — Maier & Maier, PLLC

(57) ABSTRACT

A method for manufacturing a contact lens having a multilayer structure using a mold, includes: (a) charging a first polymerizing composition into a space formed by combining a first mold with a second mold, and polymerizing a first semi product having a thinner thickness and a smaller outer diameter than those of a contact lens immediately before being removed from the molds after all polymerizing processes; (b) opening the first and second molds; and (c) charging a second polymerizing composition into a space formed by combining a third mold with one of the first and second mold, the first semi product fixed onto the one of the first and second molds, and polymerizing the second polymerizing composition.

20 Claims, 6 Drawing Sheets

(51) Int. Cl.
*B29C 39/02* (2006.01)
*B29C 43/36* (2006.01)
B29K 83/00 (2006.01)
B29K 105/00 (2006.01)
B29L 9/00 (2006.01)
B29L 11/00 (2006.01)

(52) U.S. Cl.
CPC ........ *B29C 43/36* (2013.01); *B29D 11/00048* (2013.01); *B29D 11/0073* (2013.01); *B29D 11/00923* (2013.01); *G02C 7/049* (2013.01); B29C 2043/147 (2013.01); B29D 11/00192 (2013.01); B29K 2083/005 (2013.01); B29K 2105/0002 (2013.01); B29K 2105/0061 (2013.01); B29K 2995/0092 (2013.01); B29L 2009/00 (2013.01); B29L 2009/005 (2013.01); B29L 2011/0041 (2013.01); G02C 2202/16 (2013.01)

(56) References Cited

U.S. PATENT DOCUMENTS

| | | | |
|---|---|---|---|
| 6,315,410 | B1 | 11/2001 | Doshi |
| 6,491,281 | B1 * | 12/2002 | Gotou ................ B29C 33/0055 249/114.1 |
| 2007/0257387 | A1 | 11/2007 | Hofmann et al. |
| 2008/0304009 | A1 | 12/2008 | Thomas et al. |
| 2012/0169994 | A1 | 7/2012 | Matsushita et al. |
| 2013/0093994 | A1 | 4/2013 | Ando et al. |

FOREIGN PATENT DOCUMENTS

| | | | |
|---|---|---|---|
| JP | 63-36484 | B2 | 7/1988 |
| JP | 02-134612 | A | 5/1990 |
| JP | 03-015020 | A | 1/1991 |
| JP | 06-208090 | A | 7/1994 |
| JP | 06-238682 | A | 8/1994 |
| JP | 07-109415 | A | 4/1995 |
| JP | 07-195558 | A | 8/1995 |
| JP | 10-309728 | A | 11/1998 |
| JP | 2000-326347 | A | 11/2000 |
| JP | 2001-517731 | A | 10/2001 |
| JP | 2003-515787 | A | 5/2003 |
| JP | 2003-516247 | A | 5/2003 |
| JP | 2005-531810 | A | 10/2005 |
| JP | 2007-328332 | A | 12/2007 |
| JP | 2010-529505 | A | 8/2010 |
| JP | 2014-134709 | * | 7/2014 |
| WO | 2011004800 | A1 | 1/2011 |
| WO | 2011161920 | A1 | 12/2011 |

* cited by examiner

[FIG. 1]
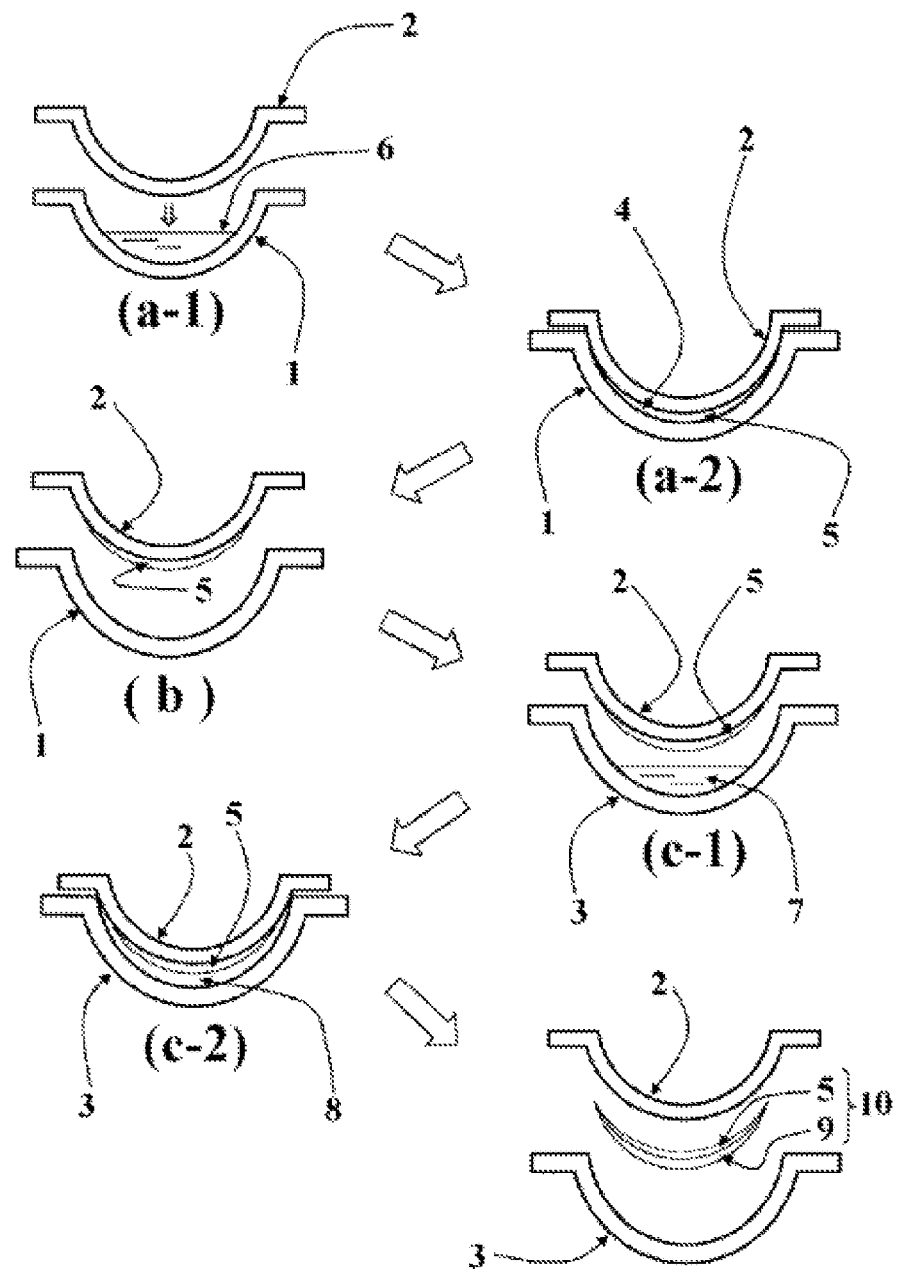

[FIG. 2]
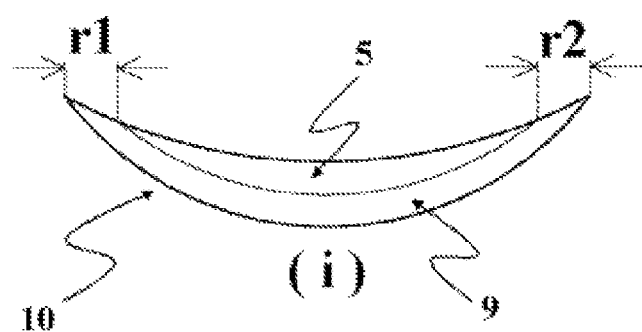
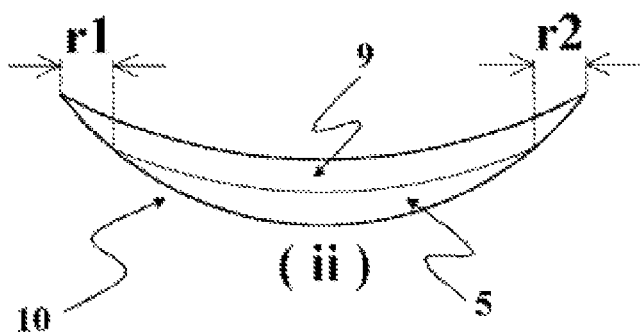

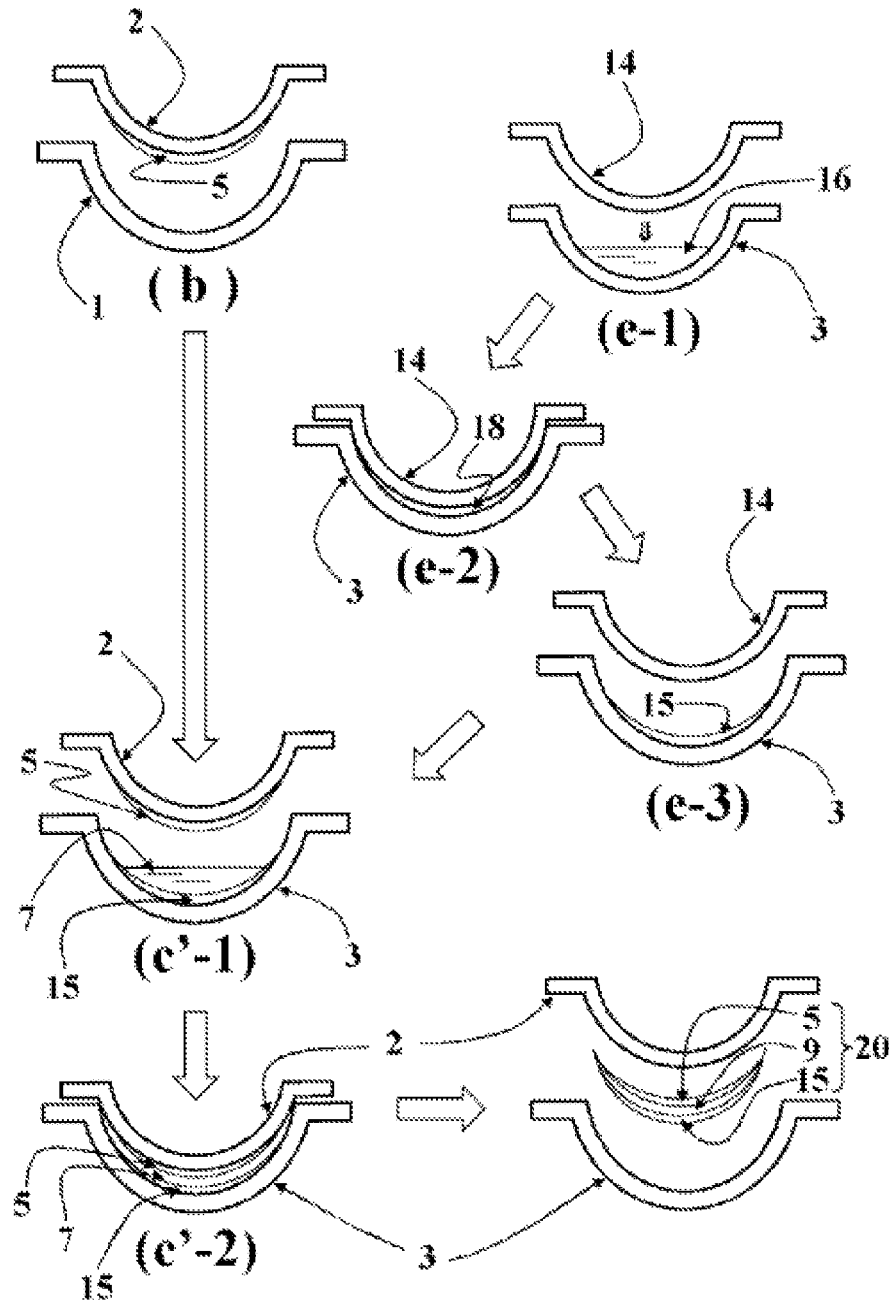
[FIG. 3]

[FIG. 4]
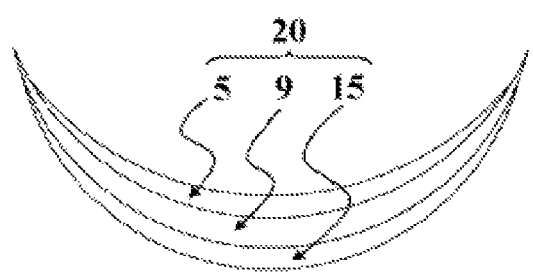

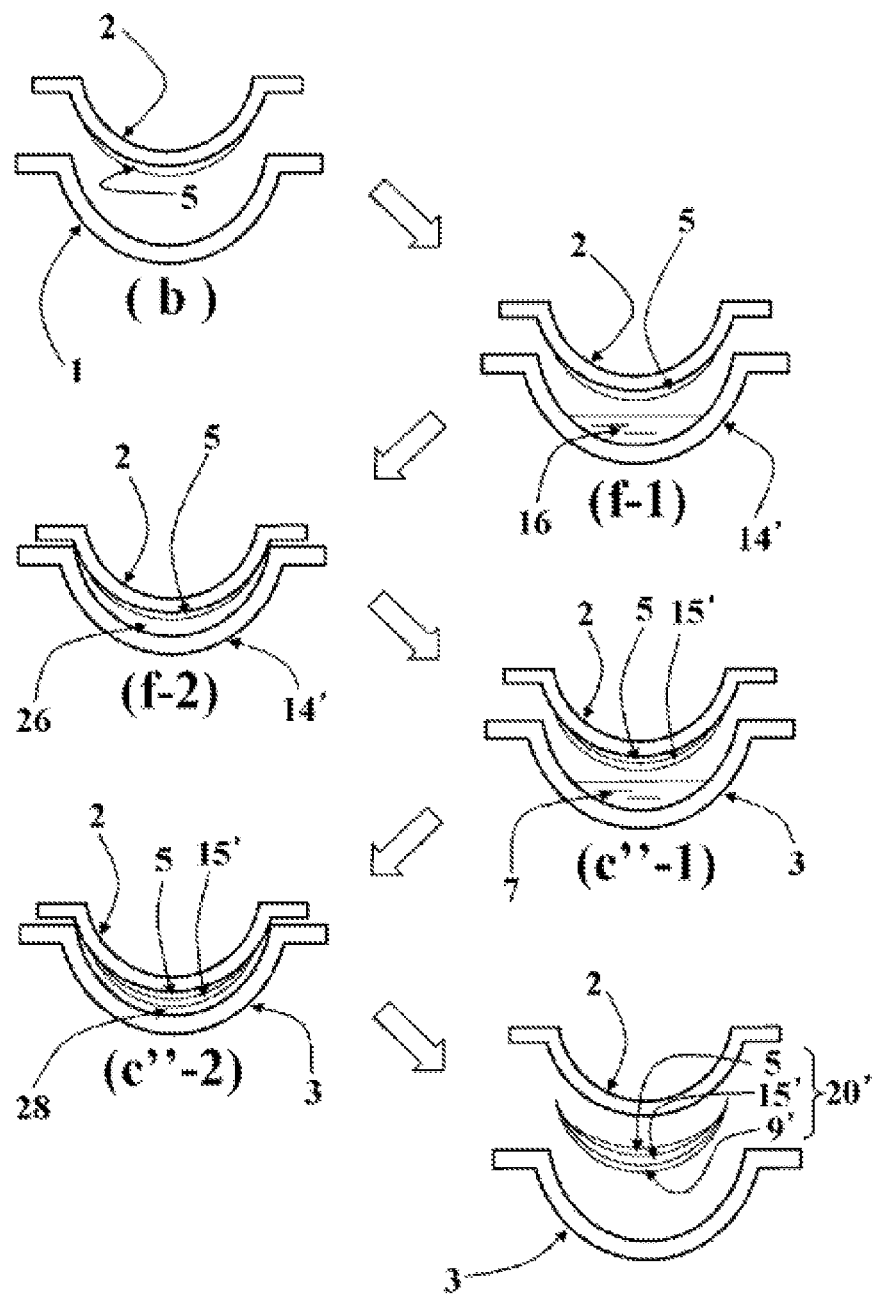
[FIG. 5]

[FIG. 6]
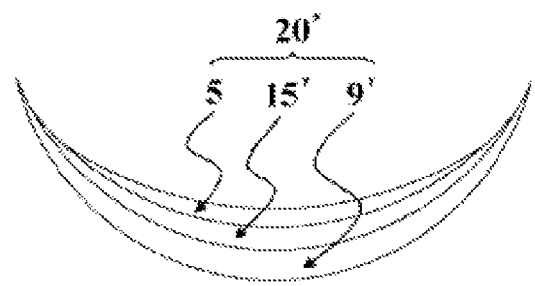
[FIG. 7]
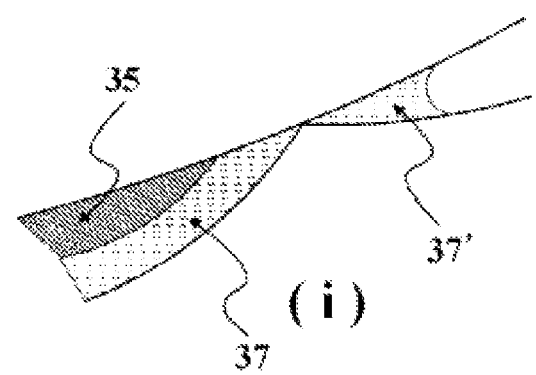
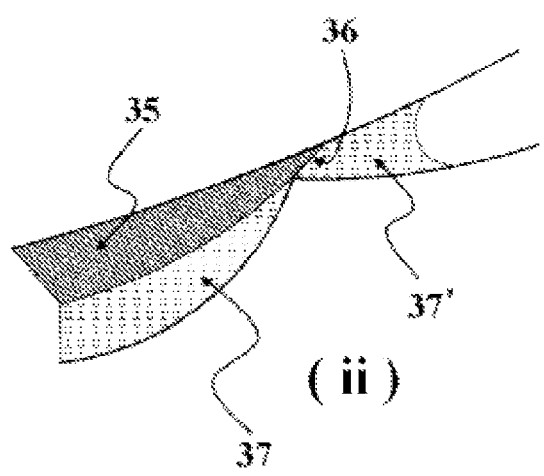

MULTILAYER CONTACT LENS AND PRODUCTION PROCESS THEREFOR

TECHNICAL FIELD

The present invention relates to a manufacturing method of a contact lens having a multilayer structure in the thickness direction. The present invention further relates to a manufacturing method of a contact lens obtained by sequentially polymerizing each of the portions forming each of the layers in a mold, and to a multilayer contact lens obtained by such manufacturing method.

BACKGROUND

In general, in a method for obtaining a contact lens by polymerization in a forming mold (hereinafter, simply referred to as "molding method") a polymerizing monomer is filled in between a female mold for forming the front side of the lens and a male mold for forming the back side of the lens, followed by heating or irradiation with ultraviolet ray or the like, thereby obtaining the finished contact lens. Since this method is simple and requires short time, it is widely employed as the method for manufacturing a disposable contact lens, which has become the mainstream of the contact lenses in recent years. When this manufacturing method is described literally, it may seem extremely simple. However, since the contact lens (hereinafter simply referred to as "lens") is a specially controlled medical device, lens with high quality such as the shape and surface smoothness appropriate for wearing it on the eye, need be manufactured.

As a major problem to be solved in the molding method, polymerization shrinkage of the composition forming the lens can be mentioned for example. The lens material is formed by polymerizing the monomers and the like which are in the form of liquid, and thus the distance between the constituent molecules or the atoms become relatively close when the monomers and the like in the form of liquid changes into solid, thereby resulting in shrinkage in total volume. As the solution to such problem, a method involving the use of a mold provided with a flexible rim for allowing the lens to follow the polymerization shrinkage (Patent Literature 1), a method involving the use of an inert replaceable diluent so as to compensate the polymerization shrinkage by using a non-aqueous solvent which does not get involved with the polymerization (Patent Literature 2), a method involving the use of a mold possessing a feeder for holding an excess amount (compared with the space for forming the lens) of the material in order to compensate with the polymerization shrinkage (Patent Literature 3), can be mentioned.

Here, burrs and chips at the edge portion of the lens are also important problems to be solved. With respect to the front side and the back side of the lens, a smooth surface can be transferred to the product by using a mold with smooth surface. On the other hand, in the contacting portion of the male mold and the female mold, burrs and chips may occur if the lens forming portion is not certainly isolated from the excess material. As the solution to such problem, a structure having a knife edge arranged at the rim portion of either one of the molds so as to be inserted into the other mold (Patent Literature 4), a method involving a surface treatment to certainly adhere the excess monomer portion onto either one of the mold and the molded lens to adhere onto the other mold selectively in the case where the mold possessing a feeder is used (Patent Literatures 5, 6), and a method involving the use a forming mold having an interlocking means to substantially prevent side-to side-movement of the male mold in relation to the female mold (Patent Literature 7) can be mentioned.

Major problems seen in the molding method were solved by these techniques, and thus it became possible to supply lens at low cost. Accordingly, there is presently a demand for improving the value of the lens by providing new function to the lens by utilizing the features of the molding method, and applying a new lens material.

As an example of improvement in the value of the lens, a colored lens capable of objectively varying the color or the texture of the pupil of the eyes can be mentioned. Such lens is referred to as iris lens. As an example of the manufacturing method of such lens, a method involving the application of a colored monomer onto the portion of the surface of the lens-forming mold where the iris is to be formed, formation of the film, charging of the monomer component for lens into the mold, followed by polymerization and separation of the lens from the mold, thereby obtaining the colored lens (Patent Literature 8), and a method involving the manufacture of a lens having the colored portion embedded in the lens material (Patent Literature 9) can be mentioned. According to such methods, the colored portion would not protrude with respect to the surface of the lens, and thus the wearer of the lens would not have uncomfortable feelings directly on the eyelids and the like. However, since the colored portion may appear on the surface of the lens, the colored portion may peel off depending on the bonding strength with the material of the lens main body. This would cause irritation to the wearer. In addition, the wearer may feel the difference in the hardness between the colored portion and its peripheral portion, or stain may adhere to the colored portions.

Accordingly, colored lens having its colored portion coated with a coating layer has been suggested (Patent Literature 10). Regarding such lens, the colored portion is covered completely, and thus the problems mentioned above can be avoided. However, there is a problem regarding its manufacture, since the coating layer is formed in a separate process by graft polymerization via plasma surface treatment or UV irradiation. Introduction of another process of different type is expected to raise the manufacturing cost, and would be problematic since the molding method is characterized in the low manufacturing cost for the lens.

Here, most of the disposable lenses are soft lenses. The soft lens is suitable for molding method, since the soft lens has less lens species (especially the base curve) than those of the hard lens, and thus number of types of the mold required is less. This would allow cut in cost and mass production. Conventionally, material of the soft lens has obtained its oxygen permeability by its high water content. Here, the material has shifted to new lens material having higher oxygen permeability, which uses siloxane-containing macromonomer and the like. When the siloxane-containing macromonomer and the like is used, extremely high oxygen permeability can be obtained, however, another process such as a surface hydrophilic treatment (Patent Literature 11) is required.

CITATION LIST

Patent Literature

Patent Literature 1: JP S59-29411B
Patent Literature 2: JP H7-109415A
Patent Literature 3: JP S63-36484B
Patent Literature 4: JP H6-208090A Patent Literature 5: JP H6-238682A
Patent Literature 6: JP H10-309728A
Patent Literature 7: JP 2003-516247A
Patent Literature 8: JP H2-134612A
Patent Literature 9: JP H3-15020A
Patent Literature 10: JP 2005-531810A
Patent Literature 11: JP 2001-517731A

SUMMARY OF THE INVENTION

Technical Problem

An object of the present invention is to provide a manufacturing method using the molding method, which can improve the value of lens by providing a new function. Another object of the present invention is to provide a manufacturing method of a lens which can be accomplished by sequential molding methods without any treatment of different type, and to provide a lens manufactured by such manufacturing method.

Means to Solve the Problem

According to one aspect of the present invention, a method for manufacturing a contact lens having a multilayer structure by using molds, comprising the steps of: (a) charging a first polymerizing composition into a space formed by combining a first mold with a second mold, and polymerizing the first polymerizing composition to obtain a first semi product having a thinner thickness and a smaller outer diameter than those of a contact lens immediately before being removed from the molds after completion of all polymerizing processes (hereinafter referred to as a polymerized lens); (b) opening the first and second molds; and (c) charging a second polymerizing composition into a space formed by combining a third mold with one of the first mold and second molds, the firs semi product being fixed onto the one of the first and second molds, and polymerizing the second polymerizing composition; and the contact lens having the multilayer structure by the manufacturing method is provided.

In the present specification, the term "polymerized lens" means a contact lens manufactured by the molding method as described above, which is in the state just before being released from the mold after all of the polymerization processes are finished. Here, the term "polymerized lens" is used separately from the contact lens product. The molding method includes a so called wet molding method which involves advance addition of diluent to the polymerizing composition for compensating with the polymerization shrinkage, and a dry molding method which does not involve the addition of diluent and the like. For example, the lens manufactured by the dry molding method does not yet contain water in the state where it is released from the mold. Then, after a wet treatment, the size of the lens swells, thereby giving the contact lens product distributed in the market. Regarding the lens manufactured by the wet molding method, the lens is allowed to be in a water containing condition by replacing the diluent with water after releasing the lens from the mold. The size of the polymerized lens is generally different from the size of the contact lens product distributed in the market as a commercial product. Accordingly, especially regarding the water containing lens, the size of the lens would differ largely depending on its condition. Therefore, it is necessary to specify the standard condition to compare the diameter size. In the present invention, the standard condition was specified as the diameter of the "polymerized lens", since the diameter of the layer polymerized in the precedent process is always smaller than the diameter of the layer polymerized in the subsequent process, regarding the manufacturing method adopted.

The "semi product" is a product in the state before the polymerized lens, and the lens as the final product cannot be obtained by conducting wet treatment and the like to the semi product itself. The outer diameter of the layer polymerized in process (a) is set to be smaller than the outer diameter of the layer polymerized thereafter. That is, the layer polymerized in the precedent process always has an outer diameter smaller than the outer diameter of the layer polymerized in the subsequent process. Preferably, the outer diameter of the layer polymerized in the precedent process is 5 to 4000 µm smaller, more preferably 10 to 2000 µm smaller, and most preferably 15 to 1000 µm smaller. Regarding the lens manufactured by the method of the present invention, the layer polymerized last would form the edge of the contact lens product. Accordingly, an effect of suppressing the occurrence of defects such as burrs and chips at the edge portion of the lens can be achieved when the contact lens product is manufactured.

In addition, the following steps of: (e-1) charging a third polymerizing composition into a space formed by combining the third mold with a fourth mold; (e-2) polymerizing the third polymerizing composition to obtain a second semi product having a thinner thickness and a smaller outer diameter than those of the polymerized lens; (e-3) opening the third and fourth molds; and (c') charging the second polymerizing composition into a space formed by combining the third mold with the one of the first and second molds, the second semi product being fixed onto the third mold, the first semi product being fixed onto the one of the first and second molds, and polymerizing the second polymerizing composition, can be carried out in place of process (c). In this method, the layers at the inner surface side and the outer surface side of the lens, with respect to the contact lens product, can be polymerized before-hand. Then, a lens having a three-layer structure in the thickness direction can be obtained by sandwiching a layer with the layers at the inner surface side and the outer surface side.

Further, the following steps of: (f-1) charging a third polymerizing composition into a space formed by combining a fifth mold with the one of the first and second molds, the first semi product being fixed onto the one of the first and second molds; (f-2) polymerizing the third polymerizing composition to obtain a polymer having a two layer structure (hereinafter referred to as a third semi product) structured by combining the first semi product with a polymer of the third polymerizing composition, the third semi product having a thinner thickness and a smaller outer diameter than those of the polymerized lens; and (c") charging the second polymerizing composition into a space formed by combining the third mold with one of the first, second, and fifth molds; the third semi product being fixed onto the one of the first, second, and fifth molds; and polymerizing the second polymerizing composition, can be carried out in place of process (c). In this method, the layers are coated over one another sequentially, and the manufacturing method of a lens having a three layer structure is as described above. By using this manufacturing method, a lens having a structure in which an internal layer using a silicone-based monomer and the like with high oxygen permeability is sandwiched with hydrophilic monomers, can be obtained for example. That is, the manufacture can be completed by sequential molding methods without involving a treatment of different type, such treatment of different type seen conventionally in the method involving a surface hydrophilic treatment as a separate process.

The outer diameters of all of the first semi product in process (a), the second semi product in process (e-2) or the third semi product in process (f-2) are smaller than that of the polymerized lens by 5 to 4000 µm. Preferably, the outer diameters of the semi products are smaller than the outer diameter of the polymerized lens by 10 to 2000 µm, most preferably 15 to 1000 µm. That is, by allowing the layer polymerized last to structure the edge portion of the contact lens product, the occurrence of defects such as burrs and chips at the edge portion of the finally obtained lens can be suppressed.

In addition, it is preferable to comprise a process of (d) coating a colored component onto an exposed surface of at least one semi product selected from the group consisting of the first, second, and third semi products. The lens manufactured by this process (d) would be a so-called iris lens. By this manufacturing process, a lens having a structure in which the colored portion is completely sandwiched can be obtained by a sequential molding method. It is preferable that the colored portion partly contains an opaque portion, since such lens is effective for objectively varying the color or the texture of the pupil.

The lens manufactured by the above described manufacturing methods can be provided with an additional function even when the lens are manufactured from the conventional lens material, since it is a contact lens having a multilayer structure in the thickness direction. In addition, by the combination with the layer structure, the advantageous point of each of the materials can be brought out while compensating with the inferior points. Accordingly, a lens material with improved additional value can be provided as a whole.

Effect of the Invention

In the method for manufacturing a contact lens having a multilayer structure in the thickness direction of the present invention, the layer polymerized in a precedent process (hereinafter referred to as "precedent layer") has a smaller outer diameter than the outer diameter of the layer polymerized in a subsequent process (hereinafter referred to as "subsequent layer"). Therefore, the precedent layer is included in the space for forming the subsequent layer. At this point, the male mold and the female mold come in contact with each other at the whole circumference of the edge of the lens. When the liquid for forming the subsequent layer is polymerized in this condition, one of the mold bites into the other mold due to the polymerization shrinkage, thereby achieving certain isolation of the polymerized lens from the cyclic polymerized by-product (excess cyclic polymerized by-product which does not constitute the lens) at the whole circumference of the edge of the lens. When the polymerized lens is taken out by separating the male mold and the female mold, the lens and the cyclic polymerized by-product at the outer side of the lens can be separated completely, thereby obtaining the desired lens.

On the other hand, when the outer diameter of the precedent layer is equal to or larger than the outer diameter of the subsequent layer, the male mold and the female mold would come into contact in some portions and would pinch the precedent layer in other portions, if the accuracy of alignment is low. Further, the thickness of the pinched portion may differ even when the whole circumference of the precedent layer is pinched. When the liquid for forming the subsequent layer is polymerized in this condition, the portion of the mold contacting with the precedent layer cannot bite into the precedent layer, and thus it becomes difficult to cut off the edge of the polymerized lens from the cyclic polymerized by-product at the outer side of the lens, regarding the portions where the precedent layer and the mold are in contact. Then, when the polymerized lens is taken out by separating the male mold and the female mold, the cyclic polymerized by-product would strongly adhere to the lens, and thus it is difficult to separate the polymerized by-product from the polymerized lens. If the polymerized by-product is separated with force, the lens would suffer defects such as burrs, rupture, scratch and the like.

Therefore, if the outer diameter of the precedent layer is set to be smaller than the outer diameter of the subsequent layer, deformation of the lens after manufacture and occurrence of burrs can be suppressed effectively. In addition, another process of different type need not be conducted, thereby allowing completion of the manufacture sequentially by the molding method. Accordingly, lens with improved value can be provided with low cost.

In addition, since the lens thus obtained has a multilayer structure, suitable material can be used for each of the layers in order to solve the problems which cannot be solved by a uniform material. Accordingly, a useful lens material which solves the problem as a whole by combining a plurality of materials can be provided.

BRIEF DESCRIPTION OF THE DRAWINGS

FIG. 1 is a figure for explaining each of the processes according to one example of the manufacturing method of the present invention.

FIG. 2 is a cross sectional view in the diameter direction of a polymerized lens having a two-layer structure according to one example of the present invention.

FIG. 3 is a figure for explaining each of the processes according to another example of the manufacturing method of the present invention.

FIG. 4 is a cross sectional view in the diameter direction of a polymerized lens having a three-layer structure according to one example of the present invention.

FIG. 5 is a figure for explaining each of the processes according to another example of the manufacturing method of the present invention.

FIG. 6 is a cross sectional view in the diameter direction of a polymerized lens having a three-layer structure according to one example of the present invention.

FIG. 7 is an enlarged cross sectional view of the edge portion of the lens when the outer diameter of the first semi product is made smaller than or the same as the outer diameter of the polymerized lens.

DESCRIPTION OF EMBODIMENTS

The present invention is related to a lens having a multilayer structure in the thickness direction and to the manufacturing method thereof. When the polymerization is carried out for each of the layers in a multi-process manner, the outer diameter of the layer polymerized in the precedent process is smaller than the outer diameter of the layer polymerized in the subsequent process. Hereinafter, the present invention will be described specifically with reference to the drawings.

In the present invention, the lens is manufactured with a polymerizing process having at least two processes, in order to obtain the lens having a multilayer structure. In FIG. 1, a process for manufacturing a lens having a two-layer structure is shown. First, a first mold (1) and a second mold (2) are prepared. In this figure, the first mold is described as the male mold and the second mold is described as the female mold, however, they may be the opposite. Either one shall be considered as the first mold and the other one shall be considered as the second mold. The material used for the mold of the present invention is formulated with a general-purpose thermoplastic resin, and polypropylene, polyethylene, polystyrene, polycarbonate, polyethylene terephthalate, polyamide, polyacetal, polyvinyl chloride and the like can be used for example. These resins can be combined and used as these molds, or the mold formed with the same resin material can be used. As the resin, polypropylene, polystyrene, polyamide and the like are preferably used since they are superior in cost, transparency, moldability, and the like. Here, as the method for forming each of the molds, injection molding, compression molding, vacuum forming, and other known methods can be arbitrarily used.

The first polymerizing composition (6) is filled into the female mold, among the molds prepared ((a-1) in FIG. 1). Subsequently, the first polymerizing composition (6) is polymerized in the space (4) made by combining the female mold and the male mold ((a-2) in FIG. 1). Here, in the present invention, (a-1) and (a-2) are collectively referred to as process (a). The polymerized product thus obtained is a first semi product (5). Compared with the polymerized lens (10) obtained as a final product in the molding method, the first semi product (5) is thinner in thickness and has smaller outer diameter. The thickness of the first semi product need not be uniform throughout the entire product. For example, when a multifocal lens is intended, it is preferable that the distribution (of the thickness) of the first polymerizing composition and the second polymerizing composition having a different refractive index from one another is graded from the lower side to the upper side of the lens, or from the peripheral portion to the central portion.

The ratio of the thickness of the first semi product with respect to the thickness of the polymerized lens depends on the actual case. Here, when there is no gradation, the thickness of the first semi product with respect to the thickness of the polymerized lens is 3 to 97%, preferably 5 to 95%, more preferably 7 to 35%, and most preferably 10 to 25%. When the thickness of the first semi product with respect to the thickness of the polymerized lens is 2% or lower, the thickness would be too thin, and thus it would be unfavorable since defects such as chips may occur in some portions. Here, when the thickness of one layer is thinner than the thickness of the other layer, the shape of the thinner layer tends to follow the shape of the thicker layer when the lens is hydrated. This would be advantageous since the shape of the lens would be stable, when the thicker layer is formed from a polymerizing composition which could be manufactured stably. Therefore, the thickness of the first semi product with respect to the thickness of the polymerized lens is preferably 35% or less. When the thickness is graded, suitable value at the thinner portion shall be 3 to 20%, and suitable value at the thicker portion shall be 7 to 40%.

The outer diameter of the first semi product is always smaller than the outer diameter of the polymerized lens. Here, the outer diameter of the first semi product is smaller preferably by 5 to 4000 μm, more preferably by 10 to 2000 μm, and most preferably by 15 to 1000 μm. The present invention is characteristic in that the outer diameter of the first semi product is designed to be "smaller". Here, the mold for the second polymerizing composition which is subsequently polymerized is used for forming the outer edge of the lens. Accordingly, deformation of the lens, occurrence of burrs and chips at the edge portions can be suppressed efficiently even when the lens with multilayer structure is made.

When the first semi product is allowed to come in contact with the second polymerizing composition, the second polymerizing composition permeates into the first semi product. When the second polymerizing composition is polymerized in this condition, a strength high enough for preventing the peeling off between the layers can be obtained. Here, if the diameter formed by the second polymerizing composition is set to be smaller than the diameter of the polymerized lens (that is, when the outer diameter of the first semi product is the same as the outer diameter of the polymerized lens), it may cause defects in the edge of the first semi product. That is, if the second polymerizing composition leak out from the space between the molds for forming the polymerized lens, at least a part of the edge of the first semi product would come in contact with the second polymerizing composition and the second polymerizing composition would permeate into the first semi product at such portion. Then, polymerization would also proceed at such portion. As described above, the bond between the first semi product and the polymerized product of the second polymerizing composition is strong, and thus defects such as burrs would occur at the edge of the first semi product when the polymerized product of the excessively leaked second polymerizing composition is separated. FIG. 7 specifically describes these circumstances. FIG. 7(i) shows a case where the outer diameter of the first semi product (35) is smaller than the outer diameter of the polymerized lens, and FIG. 7(ii) shows a case where the outer diameter of the first semi product is the same with the outer diameter of the polymerized lens, and the diameter formed by the second polymerizing composition (37) is smaller than the outer diameter of the polymerized lens. It shall be understood that the edge portion (36) of the first semi product is in contact with the excess second polymerizing composition (37').

As shown in FIG. 7, it can be understood that the occurrence of burrs and chips at the edge portion can be effectively suppressed by setting the diameter formed by the composition polymerized in the precedent process "smaller" than the diameter formed by the composition polymerized in the subsequent process. Here, if the composition polymerized in the subsequent process can be filled accurately so as not to create excess portion (37') shown in FIG. 7(ii), or if the diameter formed by the composition polymerized in the precedent process can be set to be the "same" with the diameter formed by the composition polymerized in the subsequent process, thereby forming identical outer edge, the above described problems of burrs and the like at the edge portion can be solved. However, such accurate filling or the operation to match the edge would require burden in the management of manufacturing procedures. Accordingly, the cost tends to rise, which is unfavorable.

As the polymerizing composition of the present invention, conventionally known monomers and the like can be used. For example, for obtaining a water containing soft lens, hydroxyalkyl (meth)acrylate, alkylene glycol mono(meth)acrylate, alkylamino alkyl (meth)acrylate, dimethyl (meth)acrylamide, glycerol (meth) acrylate, glycidyl (meth) acrylate, vinylpyrrolidone, (meth)acrylic acid and the like can be used. For obtaining a non-water containing soft lens, monomers providing a polymer with low glass transition temperature such as n-butyl (meth)acrylate, decyl (meth)acrylate, lauryl (meth)acrylate and the like can be used. As the material having oxygen permeability, monomers such as silicone-containing alkyl (meth)acrylate and the like and silicone-containing macromere can be used in combination with the above described monomers and the like. There is no essential monomer and the like for either one of the first, the second, or the third polymerizing composition. The type, composition ratio and the like can be selected arbitrarily depending on the lens product to be obtained. Here, the afore-described monomers and the like are provided only as an illustration of the part of monomers and the like that can be used in the present invention. Therefore, the monomers and the like shall not be limited to these.

Description will be given referring back to FIG. 1. The surface of the first semi product (5) at the side fixed on the mold would structure one surface of the polymerized lens (10). On the other hand, the surface at the exposed side would be covered with a second polymerizing composition (7) which is polymerized in the subsequent process, and thus a lens having a two layer structure is made. Therefore, when the surface of the first semi product at the side fixed on the mold is intended to be used as the inner side of the polymerized lens, it is preferable to selectively fix the first semi product onto the male mold in the process where the first mold and the second mold are separated, as shown in FIG. 1(b). On the contrary, when the first semi product is used as the outer side of the polymerized lens, it is preferable that the first semi product is selectively fixed onto the female mold. As a method for controlling such selectivity for certain, (I) a method involving the preparation of the first and second molds from mold materials different from each other in the adhesion property with respect to the first semi product, can be mentioned. Here, the method uses a mold material having high adhesion property with the first semi product for the mold onto which the first semi product is desired to be fixed, and a material having low adhesion property with the first semi product as the mold material for the other mold (for example, in a case where the water containing lens is being manufactured, the mold material for fixing the first semi product shall be made with a hydrophilic mold material such as polyamide, and the mold material for exposing the first semi product shall be made with a hydrophobic mold material such as polypropylene, since the first polymerizing composition is formulated with hydrophilic monomers and the like). In addition, (II) the mold material for the first mold and the second mold may be prepared with the same material, and either one of the first and second molds may be subjected to a surface treatment of some type (for example, plasma, UV irradiation, corona discharge, laser, or application of surfactant) to improve adhesion of the first semi product or to allow easier detachment of the first semi product. Otherwise, (III) a method for opening the mold which can selectively determine onto which one of the firs and second molds the first semi product is fixed (for example, when the mold is opened in a state where a temperature gradient is applied from the first mold to the second mold, the first semi product remains selectively onto the mold with lower temperature) may be adopted in process (b) of the present invention.

The adhesion surfaces of the first semi product with the surface of the first mold and the second mold respectively are antisymmetric (that is, the convex surface of the first semi product adheres with the concave surface of the mold, and the concave surface of the first semi product adheres with the convex surface of the mold), and thus the mold can usually be opened in a state where the first semi product is fixed onto one of the mold selectively. The method for controlling as described above can be controlled more certainly, and adoption of the technique for more certain control shall be comprehensively determined by taking cost and the like into consideration.

In the space (4), the first polymerizing composition (6) is filled. Here, a separate gap for retaining an excess amount of the first polymerizing composition may be formed when the first mold and the second mold are combined. Although not shown in FIG. 1, the excess amount may be retained in a feeder to suppress the shrinkage which occur during the polymerizing process. As another method for avoiding polymerizing shrinkage, a method involving an advance addition of a non-reactive substance which does not participate in the polymerization, into the polymerizing composition, can be mentioned. In addition, a method involving the use of the first mold and(or) the second mold formed with a material having flexibility so as to compensate with the shrinkage, can be mentioned. In process (a) of the present invention, the surface of the first semi product fixed onto the mold will form either one of the inner surface or the outer surface of the polymerized lens. The exposed surface which is not fixed onto the mold will be covered with the second polymerizing composition. The surface which is to be covered with the second polymerizing composition does not have to be accurate in its surface shape. Therefore, the first mold or the second mold for forming such surface may have flexibility to compensate with the polymerization shrinkage.

Here, in the polymerization of the polymerizing composition of the present invention, known methods can be used. For example, thermal polymerization by heating, photopolymerization by irradiation with light such as ultraviolet ray, and combination of these can be mentioned. Thermal polymerization is carried out by gradually raising the temperature starting from around ambient temperature, and applying heat in the temperature range of 30 to 120° C. for several minutes to several hours. As the thermal polymerization initiator, persulfates, peroxides, azoic initiators and the like can be mentioned. On the other hand, concerning the photopolymerization, polymerization proceeds by active energy irradiation such as irradiation with ultraviolet ray, electron beam and the like. As the photopolymerization initiator, initiators of alkylphenone type, acylphosphineoxide type and the like can be mentioned. Such polymerization method and the initiator can be selected arbitrarily depending on the polymerizing composition and the mold material.

In FIG. 1, the mold is opened in process (b) in a condition where the first semi product (5) is fixed onto the second mold (2). Accordingly, the second polymerizing composition will be poured into the third mold (3). When the mold is opened in a condition where the first semi product is fixed onto the first mold (1), the third mold is used as the male mold instead of the second mold, and the second polymerizing composition will be poured onto the first semi product. Therefore, as shown in FIG. 1, the third mold is not always a female mold. It is necessary to use a third mold so that a space formed with the third mold in combination with the mold onto which the first semi product is fixed onto in process (b) has a shape of the polymerized lens.

The second polymerizing composition and the first polymerizing composition are not always different compositions. For example, when an iris lens described later is manufactured, there may be a case where a coloring component would be applied onto the exposed surface of the first semi product, followed by the usage of the same composition as the first polymerizing composition as the second polymerizing composition. On the other hand, when a multifocal lens as described above is made, it is preferable that each of the polymerizing composition forms a polymer having a refractive index differing from each other. Therefore, different types of polymerizing compositions would be used.

As an example where the different types of polymerizing compositions are used in combination, a lens of which layers have different hardness from each other, in addition to the refractive index, can be manufactured. Conventionally, a two-type material lens using a hard lens for the center portion and a soft lens for the periphery portion has been suggested. The characteristics of such two-type material lens are that the lens would have a combined advantage of the hard lens and the soft lens. That is, the center portion is formed with the hard lens having superior visual correction and the periphery portion is made soft to improve the wearing feelings. There are several manufacturing methods for such lens. Basically, the lens had a material distribution in the center portion and the periphery portion. Here, there are two problems in the two-type material lens. The first problem is the way of removing the lens from the eye, and the second problem is the weak bonding of the two materials due to the small area for contacting the different materials. Regarding the way of removing the lens from the eye, hard lens is removed generally by gathering the upper and lower eye lids toward the center, which can be adopted since the edge portion of the lens is hard. On the other hand, the soft lens is removed from the eye by bending the lens by pinching the lens with thumb and forefinger. However, when the two-type material lens is removed from the eye, the lens cannot bent as the soft lens since it cannot be pinched due to the hard portion, and the lens is difficult to remove by the force of the eye lids as the hard lens since the edge portion is soft.

Here, a case where a lens with layers having different hardness from each other, which can be obtained by the manufacturing method of the present invention, will be described. The reason why the soft lens is inferior in visual correction to the hard lens is since the soft lens follows the unevenness of the surface of the cornea. That is, the soft lens is inferior in astigma correction. Accordingly, in the present invention, the inner side of the lens is made with a harder layer, and the outer side of the lens is made with a softer layer. The hardness at the inner side of the lens would prevent the lens from following the unevenness of the cornea, allowing to pool tears in between the inner surface of the lens and the cornea and achieving visual correction. On the other hand, the outer surface of the lens is made soft to maintain the good wearing feelings, and the lens as a whole can have the flexibility so as to be pinched when the lens is removed from the eye.

In addition, the bonding surface of each materials are not small as the multi-type material lens made by bonding different types of materials at the center portion and its periphery portion of the lens, and the adhesion between the materials can be improved dramatically since the multiple layer lens has a layered structure in the thickness direction. As described, a lens with comprehensively superior properties of visual correction, wearing feelings, simple removal, durability and the like can be designed.

The material and the molding method of the third mold are the same as the first mold and the second mold. Therefore, description will be omitted. In FIG. 1, when the second mold (2) having fixed thereon the first semi product (5) is combined with the third mold (3) after pouring the second polymerizing composition (7) into the third mold (3) (FIG. 1 (c-1)), the space (8) thus formed is filled with the second polymerizing composition (7). The second polymerizing composition is polymerized (FIG. 1 (c-2)) to form the polymerized lens (10). The processes of (c-1) and (c-2) in FIG. 1 are collectively referred to as process (c) of the present invention.

The polymerizing method, polymerization initiator, and the measures taken for the polymerization shrinkage regarding the second polymerizing composition are the same as the first polymerizing composition. Here, since the surface formed with the third mold would be the surface of the polymerized lens, the measures taken for the polymerization shrinkage would be crucial. The measure taken by the flexibility of the mold as described above cannot achieve stable product qualities. In FIG. 1, it is shown that the polymerized lens (10) is structured by forming the polymer (9) of the second polymerizing composition as the outer surface with the first semi product (5) as the inner surface. Of course the polymer (9) and the first semi product (5) may be arranged in an opposite manner. Here, it would make no difference in that the polymer of the second polymerizing composition forms the outer edge of the polymerized lens. The cross sectional view in the diameter direction of the polymerized lens is shown in FIG. 2.

As shown in FIG. 2, the first semi product (5) is smaller than the outer diameter of the polymerized lens (10) by (r1+r2). The (r1+r2) in FIG. 2(i) and the (r1+r2) in FIG. 2(ii) are shown as if they are the same, however, they may be different from each other. In the present invention, (r1+r2) is in the range of 5 to 4000 μm, preferably 10 to 2000 μm, and most preferably 15 to 1000 μm. In FIG. 2, r1 and r2 are the same. That is, the first semi product (5) and the polymerized lens (10) are concentric, however, r1 and r2 may be made different from each other to provide eccentricity to the first semi product.

Next, a case where process (d) for coating a colored composition onto the surface of the first semi product is provided in between process (b) and process (c) will be described. After opening the mold in process (b), the colored composition is coated onto the exposed surface of the first semi product with a desired design. The design is structured with either one of a dot, a line, and a plane, or with a combination thereof. The design may be colored, or may express a letter, a figure, a symbol, or a pattern of the iris. As the coating method in process (d), conventional methods can be arbitrarily used, and screen printing, pad printing, ink jet printing and the like can be mentioned for example. Determination on which coating method shall be used will be made by taking into consideration the physical properties of the colored composition and the physical properties of the first semi product, or whether the surface is convex or concave. It is preferable that the colored composition is fixed so as not to diffuse by the addition of the second polymerizing composition after coating the colored composition onto the first semi product. As the method for fixing the colored composition, various methods (heating, drying, electron beam irradiation and the like) can be mentioned, and these can be selected arbitrarily.

When manufacturing the iris lens, iron oxide and titanium oxide and the like are added to the colored component as an opaque material in order to mask the iris of the lens wearer to objectively vary the color or the texture of the pupil of the eyes, and a thickener is added to control the flowability. In addition, monomer and the like can be added to more strongly bond with the first and the second polymerizing compositions. Since the colored component is completely sandwiched with the first and the second polymerizing compositions, the bleeding out of the colored component can be effectively suppressed. However, taking into consideration that the first and the second polymerizing compositions are separated from each other by the colored component, it is preferable to add the monomer and the like.

It is also possible to manufacture a colored transparent lens by not adding the opaque material. When the entirety of the lens is colored with one color, addition of the colored component into the first and(or) the second polymerizing composition beforehand would be sufficient. When it is desired to color the lens partially with different colors, or when it is desired to display a letter, a figure and the like on the entirety of the lens, the manufacturing method of the present invention is effective. Determination on whether or not to incorporate process (d) into the lens manufacturing line can be made depending on the circumstances. Transparent lenses can be manufactured in general, and a character and the like can be expressed on a custom-made lens upon the request from the wearer. Accordingly, value of the lens can be easily improved without the need of stock management.

Specific examples of the lens having a two-layer structure have been described above. A lens having a three-layer structure or a structure with layers of more than three can be manufactured as a matter of course. Hereinafter, a case where the lens having a three-layer structure is manufactured will be described.

The procedures up to process (b) are the same as described above. There are mainly two pathways to form a three-layer structure. One pathway is to polymerize a third semi product so as to cover the first semi product, and then further form a layer so as to cover the third semi product; and another pathway is to separately polymerize a second semi product to be combined with the first semi product, and then bonding them with an intermediate layer. In FIG. 3, a manufacturing process after process (b) for the case where the first semi product (5) is fixed onto the second mold (2) as the male mold is described. Here, the procedure for polymerizing the second semi product (15) to be combined with the first semi product (5) is shown. The fourth mold (14) used in this process is a male mold since it need be combined with the third mold (3) which is a female mold. In FIG. 3(e-1), the third polymerizing composition (16) is poured into the third mold (3). Subsequently, the fourth mold (14) is combined with the third mold (3) to form a space (18), and then the second semi product (15) is polymerized (FIG. 3(e-2)).

The fourth mold (14) and the third mold (3) are opened in a condition where the second semi product (15) is fixed onto the third mold (3) (FIG. 3(e-3)). The second polymerizing composition (7) is poured onto the second semi product (15) (FIG. 3(c'-1)), and then the third mold is combined with the second mold (2) having fixed thereon the first semi product (5), thereby forming the polymerized lens (20) (FIG. 3(c'-2)). In this process, a polymerized lens (20) having a three-layer structure in which the polymer (9) of the second polymerizing composition is sandwiched with the polymer (5) of the first polymerizing composition and the polymer (15) of the third polymerizing composition. This process is advantageous in that the intermediate layer functions as the bonding layer of the other two layers, thereby providing even adherence between each of the layers. Here, (c'-1) and (c'-2) of FIG. 3 are collectively referred to as process (c') of the present invention, and (e-1), (e-2), and (e-3) are collectively referred to as process (e) of the present invention.

A cross sectional view in the diameter direction of the polymerized lens (20) is shown in FIG. 4. As apparent from FIG. 4, both of the first semi product (5) and the second semi product (15) have smaller outer diameters than that of the polymerized lens (20). That is, the polymerization is carried out in a space designed so that the outer diameter of the polymer polymerized in the precedent process is smaller than that of the outer diameter of the polymer polymerized in the subsequent process. Here, since the first semi product and the second semi product are polymerized via a separate pathway, the precedency of the polymerization cannot be determined. The diameter of them can be the same, or either one of the semi product can have a smaller diameter than that of the other semi product. When a structure shown in FIG. 4 is taken into consideration, it is considered that the second semi product (15) forming the outer side of the lens would have a larger influence on the shape of the lens than the first semi product (5) forming the inner side of the lens. From such viewpoint, there are cases where the ratio of the thickness of each of the layers against the entire lens is made larger in the order of "layer at the inner side intermediate layer≤layer at the outer side".

On the other hand, the process in which the third semi product having a two-layer structure is made by carrying out the polymerization so that the first semi product (5) is covered with a polymer, is shown in FIG. 5. In FIG. 5, the fifth mold (14') is a female mold since it should be combined with the second mold (2) which is a male mold. The third polymerizing composition (16) is poured into the fifth mold (14') (FIG. 5(f-1)), and is then polymerized in the space (26) made by combining the fifth mold with the second mold (2) (FIG. 5(f-2)). Here, the polymer (15') of the third polymerizing composition is polymerized so as to cover the first semi product (5), thereby forming the third semi product having a two-layer structure.

The second polymerizing composition (7) is poured into the third mold (3) (FIG. 5(c"-1)), and then the second mold (2) having fixed thereon the first semi product (5) and the polymer (15') of the third polymerizing composition is combined with the third mold, followed by polymerization of the second polymerizing composition in the space (28) (FIG. 5(c"-2)). In this process, a polymerized lens (20') having a three-layer structure in which the polymer (15') of the third polymerizing composition is sandwiched with the first semi product (5) and the second polymerizing composition (9'). Here, (c"-1) and (c"-2) of FIG. 5 are collectively referred to as process (c") of the present invention, and (f-1) and (f-2) of FIG. 5 are collectively referred to as process (f) of the present invention.

A cross sectional view in the diameter direction of the polymerized lens (20') is shown in FIG. 6. As apparent from FIG. 6, the first semi product (5) has an outer diameter smaller than that of the polymer (15') of the third polymerizing composition, and the polymer of the third polymerizing composition has an outer diameter smaller than that of the polymerized lens (20'). That is, the polymerization is carried out in a space designed so that the outer diameter of the polymer polymerized in the precedent process is always smaller than the outer diameter of the polymer polymerized in the subsequent process.

Here, in each of the above described processes, the conditions of the fourth mold and the fifth mold such as the material of the molds are the same as the other molds, and the polymerizing conditions of the polymerizing compositions are also the same. As a preferable example of the lens having the three layered structure as shown in FIG. 4 and FIG. 6, a lens structured by using a material with high oxygen permeability as the intermediate layer and a hydrophilic material as the surface layer, can be mentioned. The material with high oxygen permeability can be obtained by using monomers such as silicone-containing alkyl(meth) acrylate and silicone-containing macromere. However, these materials generally possess the problem in water repellency. Accordingly, monomers and the like showing hydrophilicity is used for the surface of the lens using such materials as the intermediate layer. With such structure, an ideal lens with high oxygen permeability and superior surface hydrophilicity can be provided. When manufacturing such lens, it is preferable that the intermediate layer using the material having high oxygen permeability has the largest thickness.

The contents of process (c') and process (c") are similar with the content of process (c). Accordingly, it can be said that the manufacturing process of each of the three layer structure is similar to the process having process (e) or process (f) in between process (b) and process (c) of the manufacturing process of the two layer structure.

Hereinafter, the present invention will be described more specifically with reference to several Examples.

EXAMPLE

Example 1

The female mold (first mold) was charged with 23 µl of a first polymerizing composition (59 w/w % of 2-hydroxyethyl methacrylate (2-HEMA), 30 w/w % of grycerol methacrylate (GMA), 0.5 w/w % of ethylene glycol dimethacrylate (EDMA), 0.5 w/w % of 2-hydroxy-2-methyl-1-phenyl-propan-1-one (HMPP) as a photoinitiator, and 10 w/w % of glycerin (added as solvent)). A male mold (second mold) treated with plasma surface treatment was joined with the female mold (first mold), and then the joined molds were irradiated with light (365 nm, 1 mW/cm$^2$) from the side of the female mold for 5 minutes under nitrogen atmosphere to allow polymerization (process a).

When the molds were separated (process b), the first semi product was adhered onto the male mold. The first semi product had a front curve of 6.6 mm, a base curve of 6.6 mm, a thickness of 0.024 mm, and an outer diameter of 10.88 mm. A light shielding substance (30 w/w % of 2-HEMA, 40 w/w % of iron oxide, 20 w/w % of titanium oxide, 10 w/w % of thickener) was printed onto the exposed surface of the first semi product (for example, the convex surface side of the first semi product (5) in FIG. 1(b)) to have a thickness of 10 µm, and was then allowed to stand in a blower for 10 minutes at approximately 25° C. The surface of the coated light shielding substance was observed to be dry (process d).

A separately prepared female mold (third mold) was charged with 35 µl of the same composition as the first polymerizing composition. Subsequently, the third mold was joined with the male mold (second mold) having the first semi product adhered thereon. Then, the joined molds were irradiated with light (365 nm, 3 mW/cm$^2$) from the side of the female mold for 5 minutes under nitrogen atmosphere to allow polymerization, and the polymerization process was completed (process c). In the cavity formed with the third mold and the second mold, a polymerized lens having an outer diameter of 10.92 mm can be obtained. When the molds were opened, the polymerized lens was obtained in a state of being adhered onto the male mold. Then, the polymerized lens was immersed in 5 ml of purified water so that the lens would contain water and be released from the male mold. The water was replaced with new purified water and the lens was immersed therein for 10 minutes at room temperature. This procedure was repeated 5 times to remove the extractable components. The polymer containing water was placed in a cavity of a propylene container containing 1 ml of purified water added with 0.9 w/w % of NaCl and 0.03 w/w % of edetic acid trisodium salt (EDTA 3Na). Subsequently, the cavity of the container was sealed with a multilayer film, followed by sterilization with autoclave at 121° C. for 20 minutes. After cooling, the multilayer film was peeled off, and the contact lens product was inspected. The lens had an intended power of −3.00 D, a center thickness of 0.11 mm, and a diameter of 14.2 mm, thereby obtaining a non-defective contact lens product without deformation.

The above described sequential manufacturing processes were repeated 8 times to manufacture 8 polymerized lens. All of them showed the above mentioned species, thereby obtaining non-defective contact lens products.

Comparative Example 1

A lens was manufactured in the same manner as Example 1, except that the outer diameter of the first semi product manufactured with the female mold (first mold) and the male mold (second mold) was designed to be 10.92 mm (that is, the same as the outer diameter of the polymerized lens formed with the female mold (third mold) and the male mold (second mold), which is 10.92 mm). As a result, three of the lenses were obtained as non-defective contact lens products without deformation as Example 1. On the other hand, five of the lenses did not have the shape of a lens since the shape after wet treatment was deformed. This was caused by the polymerization of the polymerizing composition, which was filled in process c and infiltrated into the peripheral of the first semi product. Accordingly, 5 lenses out of 8 lenses thus manufactured had to be disposed as defective products.

Comparative Example 2

A lens was manufactured in the same manner as Example 1, except that the outer diameter of the first semi product manufactured with the female mold (first mold) and the male mold (second mold) was designed to be 11.12 mm (that is, 0.2 mm larger than the outer diameter of the polymerized lens formed with the female mold (third mold) and the male mold (second mold)). As a result, all of the 8 lenses were deformed in a similar manner as the defective products of the Comparative Example 1, and did not have the shape of a lens. Accordingly, 8 lenses out of 8 lenses thus manufactured had to be disposed as defective products.

Example 2

The female mold (first mold) was charged with 23 µl of the first polymerizing composition (99 w/w % of 2-HEMA, 0.5 w/w % of EDMA, 0.5 w/w % of HMPP). A male mold (second mold) treated with plasma surface treatment was joined with the female mold (first mold), and then the joined molds were irradiated with light (365 nm, 1 mW/cm$^2$) from the side of the female mold for 5 minutes under nitrogen atmosphere to allow polymerization (process a).

When the molds were separated (process b), the first semi product was adhered onto the male mold (second mold). The first semi product had a front curve of 6.6 mm, a base curve of 6.6 mm, a thickness of 0.005 mm, and an outer diameter of 10.88 mm.

A separately prepared female mold (fifth mold) was charged with 30 µl of the third polymerizing composition (30 w/w % of a polydimethyl siloxane having propyl methacrylate group at both ends and an average molecular weight of 5000, 30 w/w % of tris(trimethylsiloxy) silyl propyl methacrylate, 39 w/w % of dimethyl acrylamide, 0.5 w/w % of EDMA, and 0.5 w/w % of HMPP). Subsequently, the fifth mold was joined with the male mold (second mold) having the first semi product adhered thereon. Then, the joined molds were irradiated with light (365 nm, 3 mW/cm$^2$) from the side of the female mold for 5 minutes under nitrogen atmosphere to allow polymerization. The third semi product having a two-layer structure thus obtained includes the first semi product by covering the first semi product, and is designed to have a center thickness of 0.04 mm, and an outer diameter of 10.92 mm. When the molds (fifth mold and second mold) were opened, the third semi product was adhered onto the male mold (second mold) (process f).

A separately prepared female mold (third mold) was charged with 35 μl of a second polymerizing composition which is the same as the first polymerizing composition. Subsequently, the third mold was joined with the male mold (second mold) having the third semi product adhered thereon. Then, the joined molds were irradiated with light (365 nm, 3 mW/cm$^2$) from the side of the female mold for 5 minutes under nitrogen atmosphere to allow polymerization, and the polymerization process was completed (process c"). In the cavity formed with the third mold and the second mold, a polymerized lens having a center thickness of 0.045 mm (including the center thickness of the third semi product) and an outer diameter of 10.96 mm can be obtained. When the molds (third mold and second mold) were opened, the polymerized lens formed as a three-layer structure was obtained in a state of being adhered onto the male mold (second mold). Then, the polymerized lens was immersed in 5 ml of purified water so that the lens would contain water and be released from the male mold. Subsequently, the wet treatment was carried out in the same manner as Example 1.

The contact lens product after the wet treatment was inspected. The lens had an intended power of −3.00 D, a center thickness of 0.07 mm, and a diameter of 14.2 mm, thereby obtaining a non-defective contact lens product without deformation. The lens has a three-layer structure in which the silicone hydrogel is sandwiched with a 2-HEMA-based material. Accordingly, the problem of surface wettability seen in silicone-based lens can be solved.

INDUSTRIAL APPLICABILITY

The present invention is related to a lens having a multilayered structure in the thickness direction and to a manufacturing method thereof. By adopting suitable materials for each of the layers, problem which cannot be solved with a single material was solved as a whole by combining a plurality of materials. Accordingly, a useful lens material can be provided.

EXPLANATION OF SYMBOLS 1 first mold
2 second mold
3 third mold
4 fourth mold
14' fifth mold
5, 35 first semi product
6 first polymerizing composition
7, 37 second polymerizing composition
9, 9' polymer of second polymerizing composition
10, 20 polymerized lens
15 second semi product
15' polymer of third polymerizing composition
37' excess second polymerizing composition

The invention claimed is:

1. A method for manufacturing a water containing soft contact lens having a multilayer structure, comprising the steps of:
   (a) charging an excessive amount of a first polymerizing composition into a space formed by combining a first mold with a second mold, and polymerizing the first polymerizing composition to obtain a first semi product having a thinner thickness and a smaller outer diameter than those of a contact lens immediately before being removed from molds after completion of all polymerizing processes to form a polymerized lens;
   (b) opening the first and second molds to form a first fixing mold in which the first semi product is fixed to an intended mold of one of the first and second molds; and
   (c) charging an excessive amount of a second polymerizing composition into a space formed by combining a third mold with the first fixing mold, and polymerizing the second polymerizing composition; wherein:
   the first and second polymerizing composition comprises at least one hydrophilic monomer selected from a group consisting of hydroxyalkyl (meth)acrylate, alkylene glycol mono(meth)acrylate, alkylamino alkyl (meth) acrylate, dimethyl (meth)acrylamide, glycerol (meth) acrylate, glycidyl (meth)acrylate, vinylpyrrolidone, (meth)acrylic acid, which forms an aqueous layer;
   one of the first mold and the second mold is male and the other of the first mold and the second mold is female;
   the first semi product has a shape of a contact lens;
   one of the third mold and the first fixing mold is male and the other of the third mold and the first fixing mold is female;
   a surface of the first semi product at the side fixed on the mold constitutes substantially an entire optical surface of either an inner surface or an outer surface of the polymerized lens,
   a mold which forms a surface of the first semi product at an exposed side has flexibility to compensate for polymerization shrinkage when polymerizing the first polymerizing composition, since the surface of the first semi product at the exposed side does not have to be accurate in its surface shape;
   the second polymerizing composition is polymerized in the condition of permeating the second polymerizing composition into the first semi product in order to obtain a strength high enough for preventing the peeling off between the first semi product and a polymerized product of the second polymerizing composition;
   a polymer of the second polymerizing composition forms an edge of the polymerized lens; and
   in order to suppress the occurrence of bur and chip defects at the edge portion of the polymerized lens, the first fixing mold and the third mold come in contact with each other at the whole circumference of the edge of the lens and as one of the molds bites into the other mold due to the polymerization shrinkage, the polymerized product of the second polymerizing composition forming the edge of the polymerized lens isolates from a cyclic polymerized by-product, which is excess cyclic polymerized by-product which does not constitute the lens, at the whole circumference of the edge of the lens.

2. The method of claim 1, wherein the first semi product has a smaller outer diameter by 15 to 1000 μm than that of the polymerized lens and is eccentric from the polymerized product of the second polymerizing composition.

3. The method of claim 1, wherein the following process of:
- (d) coating a colored composition onto the exposed surface of the first semi product and fixing the colored composition so as not to diffuse by contact with the second polymerizing composition, is carried out between process (b) and process (c), wherein, the method for fixing the colored composition is selected from a group consisting of heating, drying and electron beam irradiation.

4. The method of claim 2, wherein the following process of:
- (d) coating a colored composition onto the exposed surface of the first semi product and fixing the colored composition so as not to diffuse by contact with the second polymerizing composition, is carried out between process (b) and process (c), wherein, the method for fixing the colored composition is selected from a group including heating, drying and electron beam irradiation.

5. The method of claim 2, wherein the first and the second polymerizing composition is polymerized so that the ratio of the thickness of the first semi product with respect to the thickness of the polymerized lens is 7 to 35% in order that the shape of the lens tends to follow the shape of a polymerized layer of the second polymerizing composition when the lens is hydrated.

6. The method of claim 4, wherein the second polymerizing composition is the same as the first polymerizing composition, and the first and the second polymerizing composition is polymerized so that the ratio of the thickness of the first semi product with respect to the thickness of the polymerized lens is 7 to 35% in order that the shape of the lens tends to follow the shape of a polymerized layer of the second polymerizing composition when the lens is hydrated.

7. The method of claim 4, wherein the second polymerizing composition is different from the first polymerizing composition, and the first and the second polymerizing composition is polymerized so that the ratio of the thickness of the first semi product with respect to the thickness of the polymerized lens is 7 to 35% in order that the shape of the lens tends to follow the shape of a polymerized layer of the second polymerizing composition when the lens is hydrated.

8. The method of claim 1, wherein the following steps of:
- (e-1) charging an excessive amount of a third polymerizing composition into a space formed by combining a third mold with a fourth mold;
- (e-2) polymerizing the third polymerizing composition to obtain a second semi product having a thinner thickness and a smaller outer diameter than those of the polymerized lens;
- (e-3) opening the third and fourth molds to form a second fixing mold in which the second semi product is fixed to an intended mold of one of the third and fourth molds; and
- (c') charging an excessive amount of a second polymerizing composition into a space formed by combining the first fixing mold with the second fixing mold, and polymerizing the second polymerizing composition, are carried out in place of process (c), wherein:

the third polymerizing composition comprises at least one hydrophilic monomer selected from a group consisting of hydroxyalkyl (meth)acrylate, alkylene glycol mono (meth)acrylate, alkylamino alkyl (meth)acrylate, dimethyl (meth)acrylamide, glycerol (meth)acrylate, glycidyl (meth)acrylate, vinylpyrrolidone, (meth)acrylic acid, which forms an aqueous layer;

the second polymerizing composition comprises a composition of either a water containing composition or a silicone composition;

the water containing composition comprises at least one hydrophilic monomer selected from a group consisting of hydroxyalkyl (meth)acrylate, alkylene glycol mono (meth)acrylate, alkylamino alkyl (meth)acrylate, dimethyl (meth)acrylamide, glycerol (meth)acrylate, glycidyl (meth)acrylate, vinylpyrrolidone, (meth)acrylic acid, which forms an aqueous layer;

the silicone composition comprises at least one composition selected from a group consisting of silicone-containing alkyl (meth)acrylate, silicone-containing macromere and silicone-based monomer, which forms an oxygen permeable layer one of the third mold and the fourth mold is male and the other of the third mold and the fourth mold is female;

the second semi product has a shape of the contact lens;

one of the second fixing mold and the first fixing mold is male and the other of the second fixing mold and the first fixing mold is female;

a surface of the second semi product at the side fixed on the mold constitutes substantially entire optical surface of either an inner surface or an outer surface of the polymerized lens;

a mold which forms a surface of the second semi product at an exposed side has flexibility to compensate for polymerization shrinkage when polymerizing the third polymerizing composition, since the surface of the second semi product at the exposed side does not have to be accurate in its surface shape;

the second polymerizing composition is polymerized in the condition of permeating the second polymerizing composition into the first and the second semi product in order to obtain a strength high enough for preventing the peeling off between the first/second semi product and a polymerized product of the second polymerizing composition;

the polymer of the second polymerizing composition forms an edge of the polymerized lens;

in order to suppress the occurrence of defects bur and chip at the edge portion of the polymerized lens, the first fixing mold and the second fixing mold come in contact with each other at the whole circumference of the edge of the lens and as one of the molds bites into the other mold due to the polymerization shrinkage, the polymerized product of the second polymerizing composition forming the edge of the polymerized lens isolates from a cyclic polymerized by-product, which is excess cyclic polymerized by-product which does not constitute the lens, at the whole circumference of the edge of the lens.

9. The method of claim 8, wherein the first and the second semi products have a smaller outer diameter by 15 to 1000 μm than that of the polymerized lens and the first and the second semi products are eccentric from the polymerized product of the second polymerizing composition.

10. The method of claim 8, wherein the following process of:
- (d) coating a colored composition onto the exposed surface of the first and/or the second semi product and fixing the colored composition so as not to diffuse by contact with the second polymerizing composition, is carried out before process (c'), wherein,
the method for fixing the colored composition is selected from the group consisting of heating, drying and electron beam irradiation.

11. The method of claim 9, the following process of:
(d) coating a colored composition onto the exposed surface of the first and/or the second semi product and fixing the colored composition so as not to diffuse by contact with the second polymerizing composition, is carried out before process (c'), wherein;
the method for fixing the colored composition is selected from the group consisting of heating, drying and electron beam irradiation.

12. The method of claim 9, wherein the first, second and third polymerizing compositions are polymerized so that the ratio of each thickness of the first and the second semi product with respect to the thickness of the polymerized lens is 7 to 35% and that a polymerized layer of the second polymerizing composition as an intermediate layer has the largest thickness in order that the shape of the lens tends to follow the shape of the polymerized layer of the second polymerizing composition when the lens is hydrated.

13. The method of claim 11, wherein the second polymerizing composition is the same as the first polymerizing composition, and the first, second and third polymerizing compositions are polymerized so that the ratio of each thickness of the first and the second semi product with respect to the thickness of the polymerized lens is 7 to 35% and that a polymerized layer of the second polymerizing composition as an intermediate layer has the largest thickness in order that the shape of the lens tends to follow the shape of the polymerized layer of the second polymerizing composition when the lens is hydrated.

14. The method of claim 11, wherein the third polymerizing composition is different from the first polymerizing composition, and the first, second and third polymerizing compositions are polymerized so that the ratio of each thickness of the first and the second semi product with respect to the thickness of the polymerized lens is 7 to 35% and that a polymerized layer of the second polymerizing composition as an intermediate layer has the largest thickness in order that the shape of the lens tends to follow the shape of the polymerized layer of the second polymerizing composition when the lens is hydrated.

15. The method of claim 1, wherein the following steps of:
(f-1) charging an excessive amount of a third polymerizing composition into a space formed by combining the first fixing mold with a fifth mold;
(f-2) polymerizing the third polymerizing composition to obtain a third semi product having a two layer structure structured by combining the first semi product with a polymer of the third polymerizing composition, the third semi product having a thinner thickness and a smaller outer diameter than those of the polymerized lens;
(f-3) the first fixing mold and the fifth mold are opened in a state in which the third semi product is fixed to a first fixing mold; and
(c") charging an excessive amount of a second polymerizing composition into a space formed by combining the first fixing mold and the third mold; and polymerizing the second polymerizing composition, are carried out in place of process (c), wherein:
The third polymerizing composition comprises a composition of either a water containing composition or a silicone composition;

the water containing composition comprises at least one hydrophilic monomer selected from the group consisting of hydroxy alkyl (meth)acrylate, alkylene glycol mono(meth)acrylate, alkylamino alkyl (meth)acrylate, dimethyl (meth)acrylamide, glycerol (meth)acrylate, glycidyl (meth)acrylate, vinylpyrrolidone, (meth)acrylic acid, which forms an aqueous layer;
the silicone composition comprises at least one composition selected from the group consisting of silicone-containing alkyl (meth)acrylate, silicone-containing macromere and silicone-based monomer, which forms an oxygen permeable layer
one of the first fixing mold and the fifth mold is male and the other of the first fixing mold and the fifth mold is female;
the third semi product has a shape of the contact lens;
one of the first fixing mold and the third mold is male and the other of the first fixing mold and the third mold is female;
the third polymerizing composition is polymerized in the condition of permeating the third polymerizing composition into the first semi product in order to obtain a strength high enough for preventing the peeling off between the first semi product and a polymerized product of the third polymerizing composition;
the fifth mold has flexibility to compensate with polymerization shrinkage when polymerizing the third polymerizing composition, since the surface of the third semi product at the fifth mold side does not have to be accurate in its surface shape;
the polymer of the third polymerizing composition forms an edge of the third semi product;
in order to suppress the occurrence of defects bur and chip at the edge portion of the third semi product, the first fixing mold and the fifth mold come in contact with each other at the whole circumference of the edge of the lens and as one of the molds bites into the other mold due to the polymerization shrinkage, the polymerized product of the third polymerizing composition forming the edge of the third semi product isolates from a cyclic polymerized by-product, which is excess cyclic polymerized by-product which does not constitute the lens, at the whole circumference of the edge of the lens;
the second polymerizing composition is polymerized in the condition of permeating the second polymerizing composition into the third semi product in order to obtain a strength high enough for preventing the peeling off between the third semi product and a polymerized product of the second polymerizing composition;
in order to suppress the occurrence of bur and chip defects at the edge portion of the polymerized lens, the first fixing mold and the third mold come in contact with each other at the whole circumference of the edge of the lens and as one of the molds bites into the other mold due to the polymerization shrinkage, the polymerized product of the second polymerizing composition forming the edge of the polymerized lens isolates from a cyclic polymerized by-product, which is excess cyclic polymerized by-product which does not constitute the lens, at the whole circumference of the edge of the lens.

16. The method of claim 15, wherein the first semi product has a smaller outer diameter by 15 to 1000 μm than that of the third semi product, the third semi product has a smaller outer diameter by 15 to 1000 μm than that of the polymerized lens, and the polymerized layer of the first and/or second polymerizing composition is eccentric from the polymerized layer of the third polymerizing composition.

17. The method of claim 15, wherein the following process of:
(d) coating a colored composition onto the exposed surface of the first and/or the third semi product and fixing the colored composition so as not to diffuse by contact with the respective polymerizing compositions,
is carried out before process (c"), wherein,
the method for fixing the colored composition is selected from the group consisting of heating, drying and electron beam irradiation.

18. The method of claim 16, the following process of:
(d) coating a colored composition onto the exposed surface of the first and/or the third semi product and fixing the colored composition so as not to diffuse by contact with the respective polymerizing compositions,
is carried out before process (c"), wherein,
the method for fixing the colored composition is selected from the group consisting of heating, drying and electron beam irradiation.

19. The method of claim 16, wherein the first, second and third polymerizing composition is polymerized so that the ratio of each thickness of the first semi product and a polymer of the second polymerizing composition with respect to the thickness of the polymerized lens is 7 to 35% and that a polymerized layer of the third polymerizing composition as an intermediate layer has the largest thickness in order that the shape of the lens tends to follow the shape of the polymerized layer of the third polymerizing composition when the lens is hydrated.

20. The method of claim 18, wherein the second polymerizing composition is the same as the first polymerizing composition, and the first, second and third polymerizing compositions are polymerized so that the ratio of each thickness of the first semi product and a polymer of the second polymerizing composition with respect to the thickness of the polymerized lens is 7 to 35% and that a polymerized layer of the third polymerizing composition as an intermediate layer has the largest thickness in order that the shape of the lens tends to follow the shape of a polymerized layer of the third polymerizing composition when the lens is hydrated.

* * * * *